(12) United States Patent
Kitayama (10) Patent No.: US 6,886,158 B2
(45) Date of Patent: Apr. 26, 2005

(54) COMPONENTWARE CREATING METHOD AND RECORDING MEDIUM

(75) Inventor: Takuro Kitayama, Tokyo (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 09/863,499

(22) Filed: May 23, 2001

(65) Prior Publication Data

US 2002/0010914 A1 Jan. 24, 2002

(30) Foreign Application Priority Data

May 25, 2000 (JP) ........................................ 2000-155010

(51) Int. Cl.$^7$ ............................................... G06F 9/44
(52) U.S. Cl. ...................................... 717/162; 719/331
(58) Field of Search ................................ 719/332, 331, 719/315, 316, 310; 717/162–167, 107, 106

(56) References Cited

U.S. PATENT DOCUMENTS

| 4,931,928 | A | * | 6/1990 | Greenfeld | 717/131 |
|---|---|---|---|---|---|
| 5,367,685 | A | * | 11/1994 | Gosling | 717/148 |
| 5,408,665 | A | * | 4/1995 | Fitzgerald | 717/163 |
| 5,655,073 | A | * | 8/1997 | Nishikado et al. | 717/124 |
| 5,701,490 | A | * | 12/1997 | Safonov | 717/143 |
| 5,721,924 | A | * | 2/1998 | Kitadate | 717/131 |
| 5,742,828 | A | * | 4/1998 | Canady et al. | 717/144 |
| 5,850,548 | A | * | 12/1998 | Williams | 717/107 |
| 5,878,262 | A | * | 3/1999 | Shoumura et al. | 717/164 |

* cited by examiner

*Primary Examiner*—Sue Lao
(74) *Attorney, Agent, or Firm*—Frommer Lawrence & Haug LLP; William S. Frommer

(57) ABSTRACT

During the process of creating a component to be referred to by another component, a declaration of a symbol in a source file is converted into an original symbol name through a compile process. A symbol information table is created in which the original symbol name is replaced with a symbol ID, which corresponds to the symbol value. Moreover, the original symbol name and the symbol ID correspond to each other so that an external symbol information file is created. When a component is used as a reference source, the original symbol name referring to another component is replaced with a pair of the component ID and the symbol ID using a file. Thus, a symbol reference information table is created. Information about the linkage of the components to be the reference source and the referent are collated by using the symbol ID based on the table.

9 Claims, 7 Drawing Sheets

| ComponentID | COMPONENT ID |
|---|---|
| ORIGINAL SYMBOL NAME 1 | SYMBOL ID 1 |
| ORIGINAL SYMBOL NAME 2 | SYMBOL ID 2 |
| ⋮ | ⋮ |
| ORIGINAL SYMBOL NAME N | SYMBOL ID N |

COMPONENTWARE CREATING METHOD AND RECORDING MEDIUM

BACKGROUND OF THE INVENTION

1. Field of the Invention

The present invention relates to a componentware creating method and a recording medium which can efficiently carry out a link processing in a system in which other componentwares are dynamically linked during loading for a componentware.

2. Description of the Related Art

In recent years, a software to be used in an information apparatus such as a computer device, a mobile terminal device and a set top box for receiving a digital broadcast is referred to as a componentware (which will be hereinafter referred to as a component). In many cases, a software to be used as a part is combined. The component is loaded if necessary when a software program is to be started, for example, and is read onto a memory. Thus, the component is incorporated in the software for use.

The components read on the memory are linked to each other to constitute one software. The components are linked based on symbol information described in the component. The symbol information is automatically set through a compiler based on a declaration in a source file of a component during the creation of the component. The symbol information includes a symbol name for identifying the symbol information and a symbol value to be relative address information corresponding to the symbol name. The relative address information is an offset value of an address in an object file obtained by compiling a source file through a compiler, for example. The symbol name is represented by a combination of English numerals to be ten-numeric letters and symbols, for example.

By way of example, the component includes a plurality of functions and the symbol information is set for the respective functions. The symbol information is managed as a symbol information table in an object file obtained by compiling the source file of the component. When an execution file is to be created, the symbol information table on a component to be a linker is referred based on the symbol information described in a component to be a link source through a linker so that the components are linked. During execution, a corresponding function is called from the linker based on the symbol information of the link source.

In the case in which the linkage is to be carried out during the loading for a program, it is necessary to check that symbol information based on a declaration in the component to be the link source is present in the component to be the linker or not. This is carried out by retrieving desirable symbol information with reference to the symbol information table of the component to be the linker.

In the case in which the number of external symbols to be retrieved is small, it is possible to carry out a processing in a short time. However, an ordinary library has a large number of symbols. Therefore, there is a problem in that a long time is required for the retrieval. In addition, it is necessary to compare symbol names many times in order to retrieve an intended symbol. Consequently, there is a problem in that a longer time is required for processing a long symbol name.

Moreover, when the symbol names are compared and collated, it is necessary to expand, onto a memory, the symbol name to be retrieved. Therefore, there is a problem in that a large memory capacity is required.

Furthermore, in the case in which two or more different components having the same symbol name are loaded onto the same system, the collision of the symbol names is caused. In this case, there is a problem in that the priority of the symbol of the component depends on the order of loading or a load error is made.

On the other hand, in order to eliminate such a collision of the symbol names, Japanese Patent No. 2655612 has disclosed the following, for example. In the case in which the different loaded components have the same symbol name, a symbol defined for a loaded component earlier on a time basis has a priority according to the conventional art but a symbol of a newly loaded component can be referred. According to the method described in the Japanese Patent No. 2655612, however, also in the case in which two components created by separate developers have the same symbol name, for example, it is impossible to expect a correct operation because the components are regarded as the same symbol.

OBJECTS AND SUMMARY OF THE INVENTION

Accordingly, it is an object of the present invention to provide a componentware creating method and a recording medium in which a processing time required for linking components can be shortened and a small amount of use of a memory is required during a linkage.

Moreover, it is another object of the present invention to provide a componentware creating method and a recording medium which can avoid the collision of symbol names between two or more components having a linking relationship.

In order to solve the above-mentioned problems, the present invention provides a componentware creating method of creating a componentware in which a first componentware and a second componentware to be a reference source of the first componentware are linked to each other during loading onto a system, comprising the steps of generating the first componentware by replacing a symbol name to be referred externally with a symbol ID for identifying the symbol name, and generating the second componentware by replacing a symbol name to be referred externally in the second componentware to be the reference source for the first componentware with a symbol ID for identifying the symbol name, wherein the first and second componentwares are linked to each other based on the symbol ID.

Moreover, the present invention provides a recording medium recording a componentware to be referred from an external componentware and to be linked during loading in a system, the recording medium recording a componentware having a symbol information table in which a symbol name to be referred externally is replaced with a symbol ID for identifying the symbol name, the symbol ID is described in relation to reference place information about a symbol corresponding to the symbol ID, and a component ID for identifying a componentware itself is described.

Furthermore, the present invention provides a recording medium recording a componentware referring to and linking an external componentware loaded onto a system, the recording medium recording a componentware having a symbol reference information table in which a component ID to be identification information added to a componentware to be a referent and a symbol ID to be symbol identification information to be referred in the component-ware to be the referent is paired and described, and reference place information in which the symbol to be referred which is indicated as the symbol ID in the component ware to be the referent indicated as the component ID is caused to correspond to the pair of the component ID and the symbol ID.

As described above, according to the first aspect of the present invention, the first componentware to be the referent is generated with the symbol name to be externally referred replaced with the symbol ID for identifying the symbol name, the second componentware to be the reference source is generated with the symbol name to be externally referred with the symbol ID for identifying the symbol name, and the first and second componentwares are linked to each other based on the symbol ID. Therefore, if the symbol ID is set to be short, a time required for collating the symbol names can be shortened and the first and second componentwares can be linked to each other at a high speed. In addition, it is possible to reduce the amount of the memory to be used which is necessary for the collation of the symbol names.

According to the fifth aspect of the present invention, moreover, the symbol name to be externally referred is replaced with the symbol ID for identifying the symbol name and the symbol ID is described in relation to the reference place information about the symbol corresponding to the symbol ID. In addition, the componentware having the symbol information table in which the component ID for identifying the componentware itself is described is recorded in the recording medium. Therefore, when the symbol is referred from another componentware with the symbol ID, the componentware read from the recording medium can know the symbol reference place based on the symbol information table.

According to the sixth aspect of the present invention, furthermore, the component ID to be the identification information added to the componentware to be the reference source and the symbol ID to be the identification information of the symbol to be referred in the componentware to be the referent are paired and described. In addition, the componentware having the symbol reference information table wherein the reference place information in which the symbol to be referred which is indicated as the symbol ID in the componentware in the referent indicated as the component ID is to be referred in the componentware to be the referent is recorded in the recording medium. Therefore, the componentware read from the recording medium can know the reference place of the symbol to be referred in another componentware based on the symbol reference information table when referring to the another component.

The above, and other, objects, features and advantage of the present invention will become readily apparent from the following detailed description thereof which is to be read in connection with the accompanying drawings.

DETAILED DESCRIPTION OF THE PREFERRED EMBODIMENT

Figure 1:
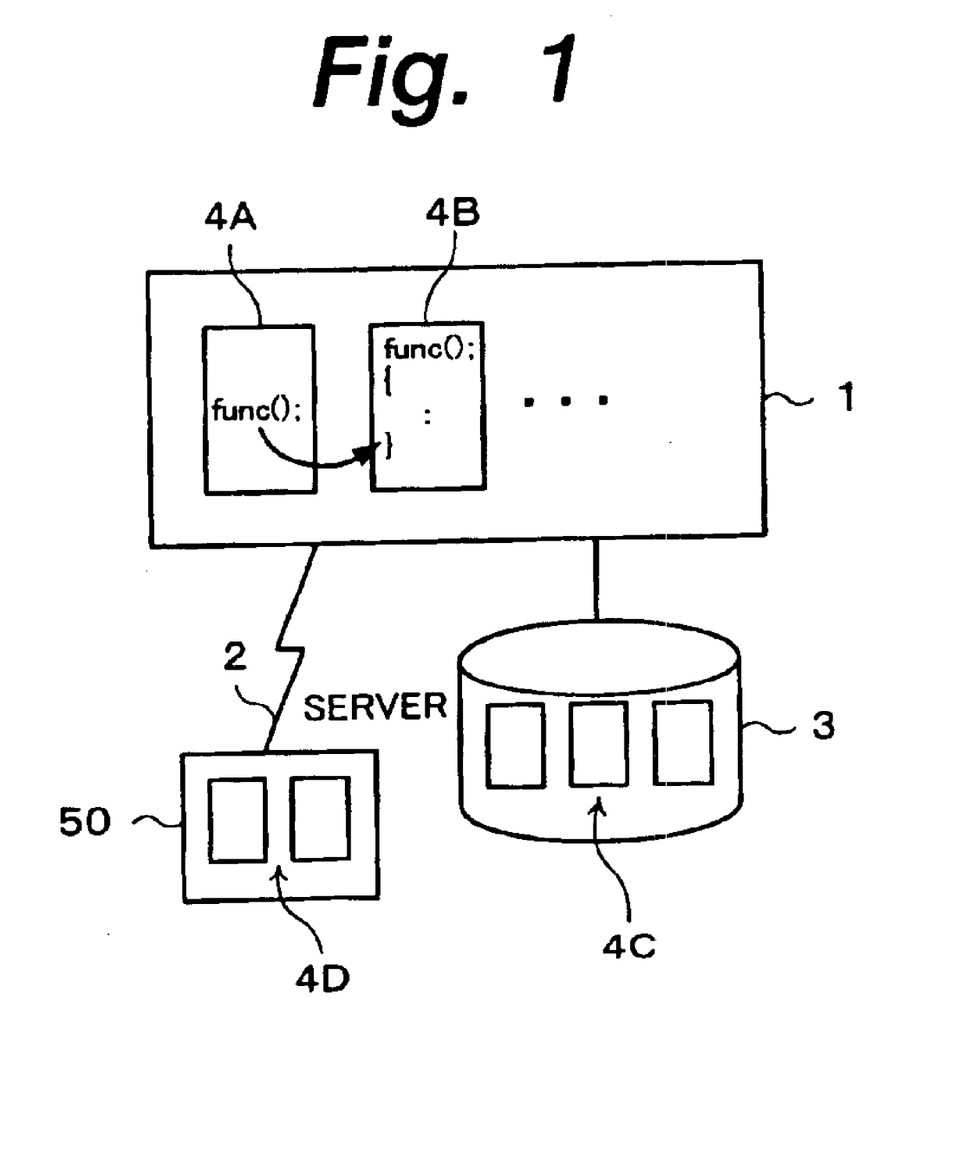
FIG. 1 is a schematic diagram showing the concept of a system applicable to an embodiment of the present invention.

An embodiment of the present invention will be described below with reference to the drawings. FIG. 1 shows the concept of a system applicable to an embodiment of the present invention. For example, in a target system 1 constituted on an information apparatus such as a mobile information device or a computer device, a plurality of components 4 to call functions from each other are loaded in order to implement the operation of a predetermined software.

The component indicates a program which can be used as a part of another program. The component has a plurality of functions, for example, and is linked to other components so that a function is called from the other components and programs and a variable is referred. In the following explanation, it is assumed that a function and a variable which are defined in a component 4B are referred based on the description of a component 4A. More specifically, the component 4A is set to be a linker and the component 4B is set to be a link source, and the component 4B is linked to the component 4A. In the example of FIG. 1, the component 4B to be the linker is referred based on a description of "func ( )" in the component 4A to be the link source, and the function ( ) of the component 4B is called.

The component 4 which is not loaded onto the target system 1 can be loaded from a secondary storage device 3 connected to the target system 1, for example (a component 4C). As the secondary storage device 3, a hard disk device, a CD-ROM (Compact Disc-Read Only Memory) or other recording media can be applied. In addition, a semiconductor storage element such as a flash memory can be applied as the secondary storage device 3. Furthermore, a floppy disk, an MO (Magnetic Optical Disk) or the like can be applied as the secondary storage device 3.

The component 4B designated by the component 4A is read from the secondary storage device 3 through the target system 1. The component 4B thus read is expanded into a memory and is loaded onto the target system 1.

In addition, the component 4 can also be downloaded from a server system 50 through a network 2 connected to the target system 1 and can be loaded onto the target system 1 (a component 4D).

Figure 2:
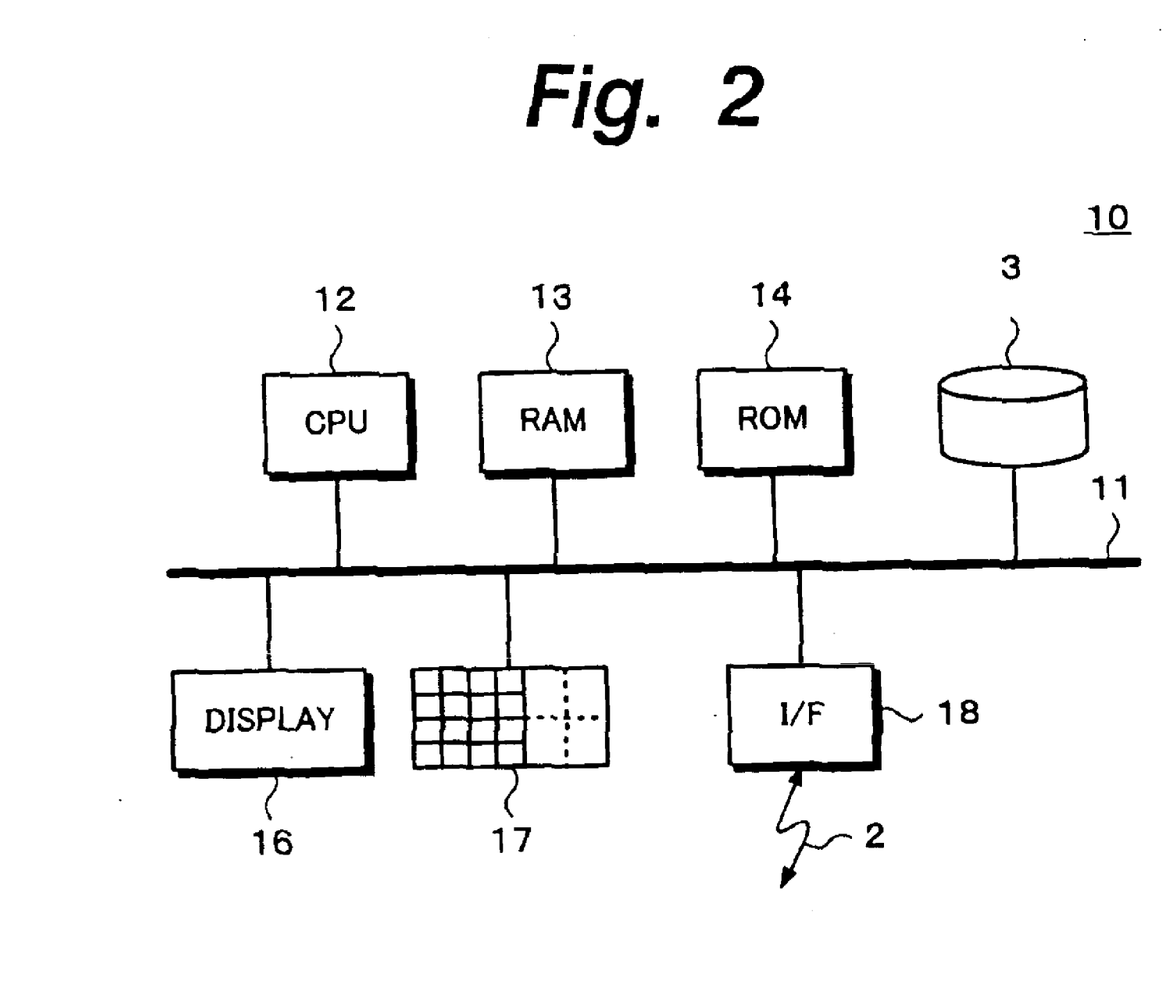
FIG. 2 is a block diagram showing the structure of an information apparatus in which a target system is constituted according to an example.

FIG. 2 shows the structure of the information apparatus in which the target system 1 is constituted according to an example. Assuming that the target system 1 is constituted on a mobile information device 10, description will be given. As a matter of course, the target system 1 may be constituted in other information apparatuses such as a personal computer, a set top box, a mobile telephone device, a domestic game device and the like. A CPU (Central Processing Unit) 12, a RAM (Random Access Memory) 13, a ROM (Read Only Memory) 14 and the secondary storage device 3 are connected to a bus 11. The RAM 13 is a work memory for the CPU 12. The ROM 14 prestores other programs, for example, an OS (Operating System) to be a basic software for operating the mobile information device 10, a component loader for loading a component, a linker for linking the components and programs required for starting.

As the secondary storage device 3, a flash memory to be a nonvolatile and rewritable memory can be used, for example. In this case, the secondary storage device 3 can carry out a conversion. In addition, a hard disk device can be used as the secondary storage device 3. Moreover, it is possible to use a recording medium such as an MO or a floppy disk as the secondary storage device 3 by utilizing a predetermined drive unit.

A display section 16, an input section 17 and a communication interface 18 are further connected to the bus 11. The display section 16 includes an LCD (Liquid Crystal Display), for example. A display control command is issued from the CPU 12 and a predetermined display is carried out on the display section 16 based on the display control command. The input section 17 is provided on the display section 16, for example, and includes a touch panel through which the display of the display section 16 can be transparent. The communication interface 18 is connected to the network 2 using a wireless or wire communication and controls a communication between the mobile information device 10 and the outside.

When the mobile information device 10 is activated, a program such as an OS which is stored in the ROM 14 is started through the CPU 12 so that the target system 1 is constituted. For example, a predetermined program is started on the target system 1 in accordance with an instruction given from the input section 17 and a necessary component is read from the secondary storage device 3 to the RAM 13 and is loaded in accordance with a description in the program.

A link in the component is specified during the creation of the component. The linking is carried out by referring to a symbol corresponding to a link source and a linker. In the present invention, a component ID indicative of a component to be a linker is attached to the component and symbol information included in the component has a symbol information table which is replaced with a symbol ID having a serial number, for example.

On the other hand, the component to be the link source has a pair of a component ID of the component to be the linker and a symbol ID of a symbol to be referred in a component indicated as the component ID. There is a symbol reference information table in which the pair of the component ID and the symbol ID corresponds to the relative address of a symbol indicated as the symbol ID in the component to be the linker.

The component to be the link source can know the relative positions of the component to be the linker and the symbol to be referred in the component based on the symbol reference information table. In general, the symbol ID can be set to be shorter than an original symbol name. Consequently, the original symbol name can be replaced with a shorter symbol ID. Therefore, the linker can be retrieved at a high speed and the amount of a memory to be used can be reduced.

Figure 3A:
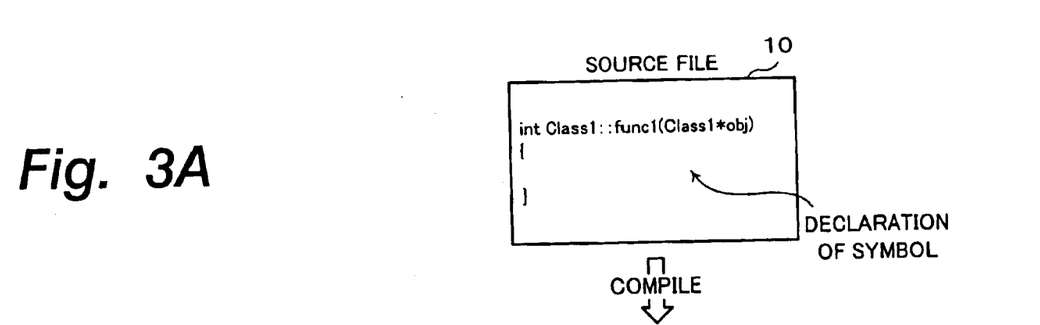
FIGS. 3A, 3B and 3C are a schematic diagram showing a method of generating a component to be a linker according to an example.
Figures 3B, 3C:
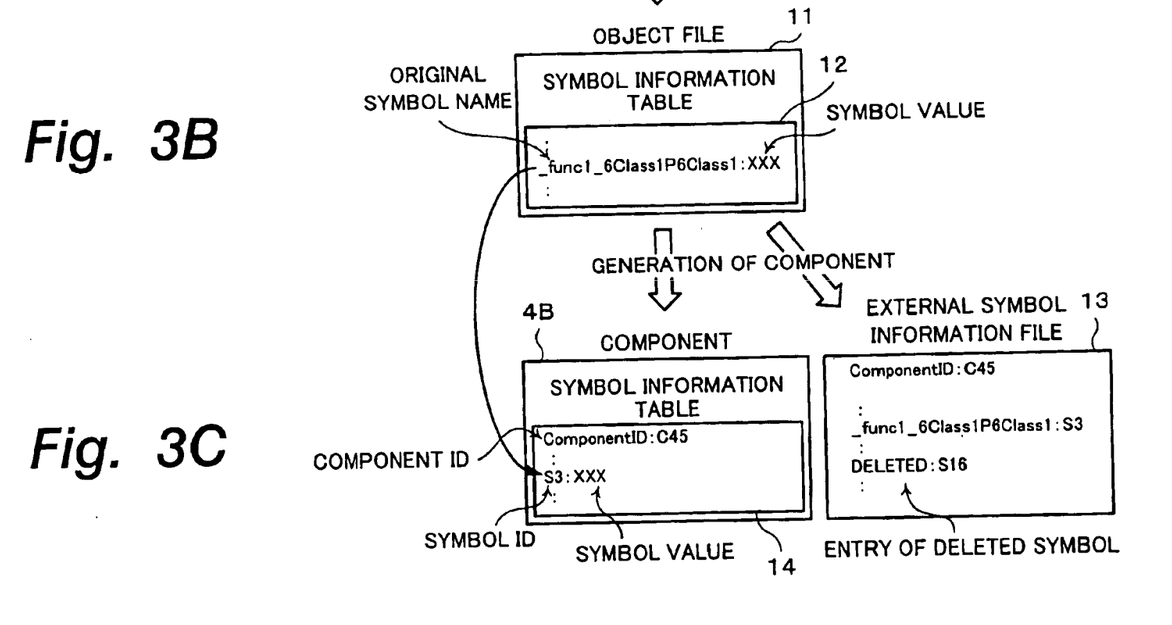
Figure 4:
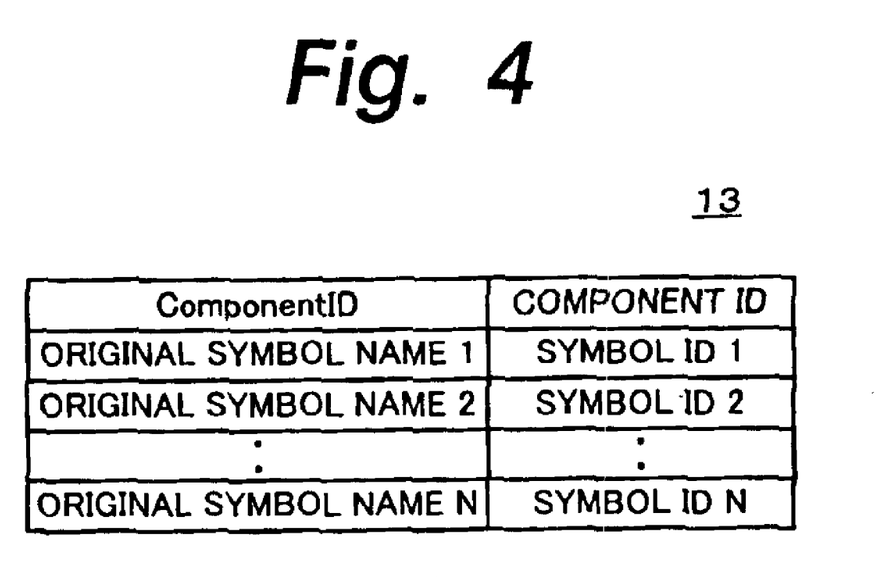
FIG. 4 is a schematic diagram showing the structure of an external symbol information file according to an example.
Figure 5A:
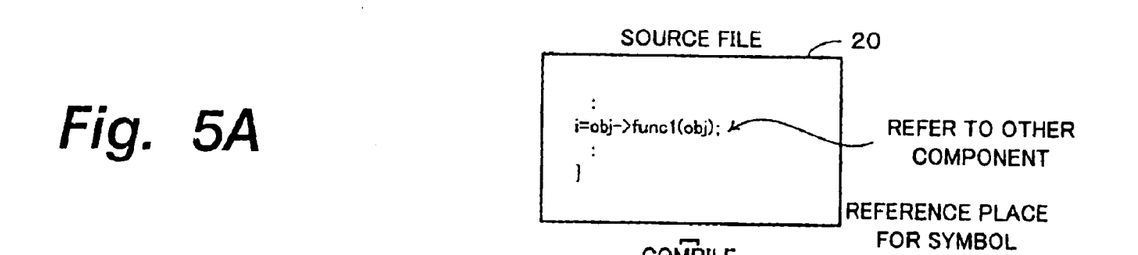
FIGS. 5A, 5B and 5C are a schematic diagram showing a method of generating a component to be a link source according to an example.
Figure 5B:
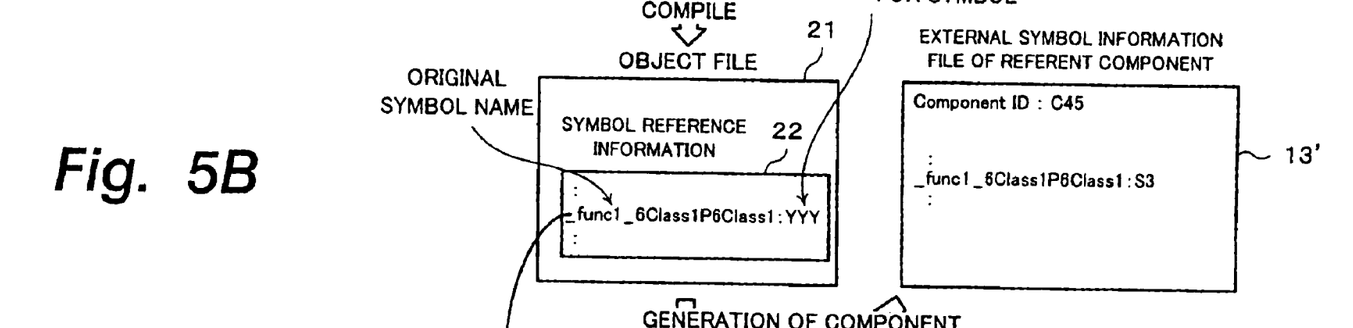
Figure 5C:
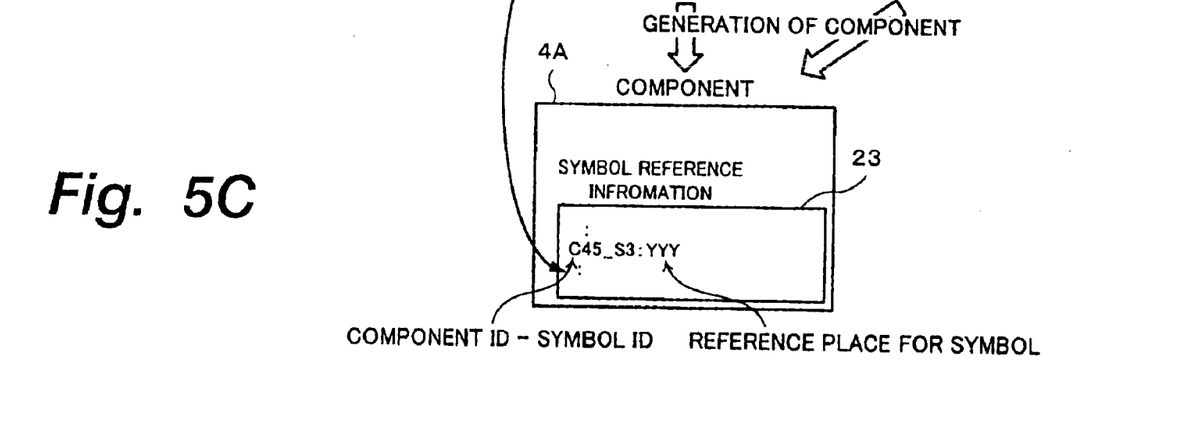

With reference to FIGS. 3 to 5, description will be given to a method of generating a component according to an embodiment of the present invention. The generation of the component to be described below can be executed in a different system from the target system 1.

FIGS. 3A, 3B and 3C show a method of generating a component (the referent component 4B) to be a linker according to an example. The component to be the linker has a symbol referred from the outside. FIG. 3A shows a state in which a symbol is declared for a function declared in the source file 10. The source file is compiled by a compiler so that an object file 11 shown in FIG. 3B is generated. The object file is an intermediate file generated in the middle of the creation of an execution type file from the source file.

Symbols referred from other components for the function and the variable which are declared in the source file 10 are listed in the symbol information table 12 in the object file 11. At this time, the declaration of the symbol which is carried out in the source file 10 is replaced with a symbol name through the compiler. As the symbol name written to the symbol information table 12, an original symbol name generated based on the description in the source file 10 is used.

In the example of FIG. 3, the symbol name has a character string of "_func1_6ClassP6Class1" formed by a combination of English numerals to be ten-numeric letters and symbols. A symbol value indicate of a relative address (offset value) in the object file 11 of the declared symbol is added to the symbol name. The replacement of the declaration of the symbol with the symbol name and the addition of the symbol value are automatically carried out through the compiler.

The referent component 4B to be a linker is created from the object file 11. At this time, the symbol information table 14 in which the symbol name is replaced with the symbol ID is created in the symbol information table 12 of the object file 11 as shown in the example of FIG. 3C according to the first embodiment of the present invention. The symbol ID is such an optional character string as not to be superposed on another symbol ID in the component. In the example of FIG. 3C, "S3" is set to be the symbol ID for the symbol name of "_func1_6ClassP6Class1". A component ID ("C45" in this example) indicative of the component 4B is set to the symbol information table 14 in which the symbol name is replaced with the symbol ID. The component ID is uniquely allocated to each component.

In the embodiment of the present invention, moreover, the external symbol information file 13 is created separately from a component file to be created. The external symbol information file 13 has such a structure that a correspondence relationship between an original symbol name and a symbol ID for a component indicated as the component ID is listed in each entry (line) as illustrated in an example of FIG. 4.

Furthermore, in the case in which the component 4B is recreated through version up and the symbol is deleted, the deletion of the symbol is described together with the deleted symbol ID for the external symbol information file 13 as shown in a line of "DELETE" of FIG. 3C. In the case in which a symbol is newly added to the component, a symbol ID which has not been used is utilized including deleted symbol. Thus, the used symbol ID can be prevented from being reused and the soleness of the symbol ID can be guaranteed in a plurality of components having different versions from each other with the same name.

FIGS. 5A, 5B and 5C show a method of generating a component to be a link source (the reference source component 4A) according to an example. The component 4A to be the link source calls a function defined in an external component and refers to a variable. FIG. 5A shows that the function of another component is referred in the source file 20. The source file is compiled by a compiler so that an object file 21 shown in FIG. 5B is generated.

The object file 21 has a symbol reference information table 22. In the symbol reference information table 22, a symbol to be referred is listed in an external component. In this case, an original symbol name generated by the compiler based on a description indicative of a reference in the source file 20 is exactly used for the symbol name of a referent. In the example of FIGS. 5A, 5B and 5C "\_func1\_6ClassP6Class1" in the object file 21 is used as a symbol name for "func1(obj)" in the source file 20. Corresponding relative address information in the component to be a referent is added to the symbol name.

Moreover, an external symbol information file 13' for the component 4B to be the referent is created from a symbol reference information table 22 and the external symbol information file 13 created during the generation of the component 4B to be the referent (FIG. 5B). A component ID and a symbol ID corresponding to the original symbol name are obtained based on the external symbol information file 13 and the symbol reference table 22. A pair of the component ID and the symbol ID thus obtained is caused to correspond to the original symbol name. This operation is carried out for all the original symbol names listed in the symbol reference information table 22.

The component 4A to be the reference source is generated from the object file 21 and the external symbol information file 13' (FIG. 5C). The component 4A has a symbol reference information table 23 in which a pair of a component ID of a referent and a symbol ID and a symbol reference address are listed correspondingly. In the example of FIG. 5C, the pair of the component ID and the symbol ID is represented by "C45_S3" and is caused to correspond to a symbol value indicative of a symbol reference location.

The symbol reference information table 23 is obtained by converting the original symbol name in the symbol reference information table 22 of the object file 21 into the pair of the component ID and the symbol ID by using the external symbol information file 13', and has address information referring to the replaced symbol name and the symbol in the component.

More specifically, it can be supposed in the symbol reference information table 23 that the original symbol name in the symbol reference information table 22 of the object file 21 is replaced with a new symbol name constituted by the pair of a component ID and a symbol ID.

While a component having a symbol to be referred from another component and a component referring to the symbol of another component have been described separately, this example is not restricted. One component can have a symbol to be referred from another component and can also refer to the symbol of another component. In such a case, the present invention can be applied.

Figure 6:
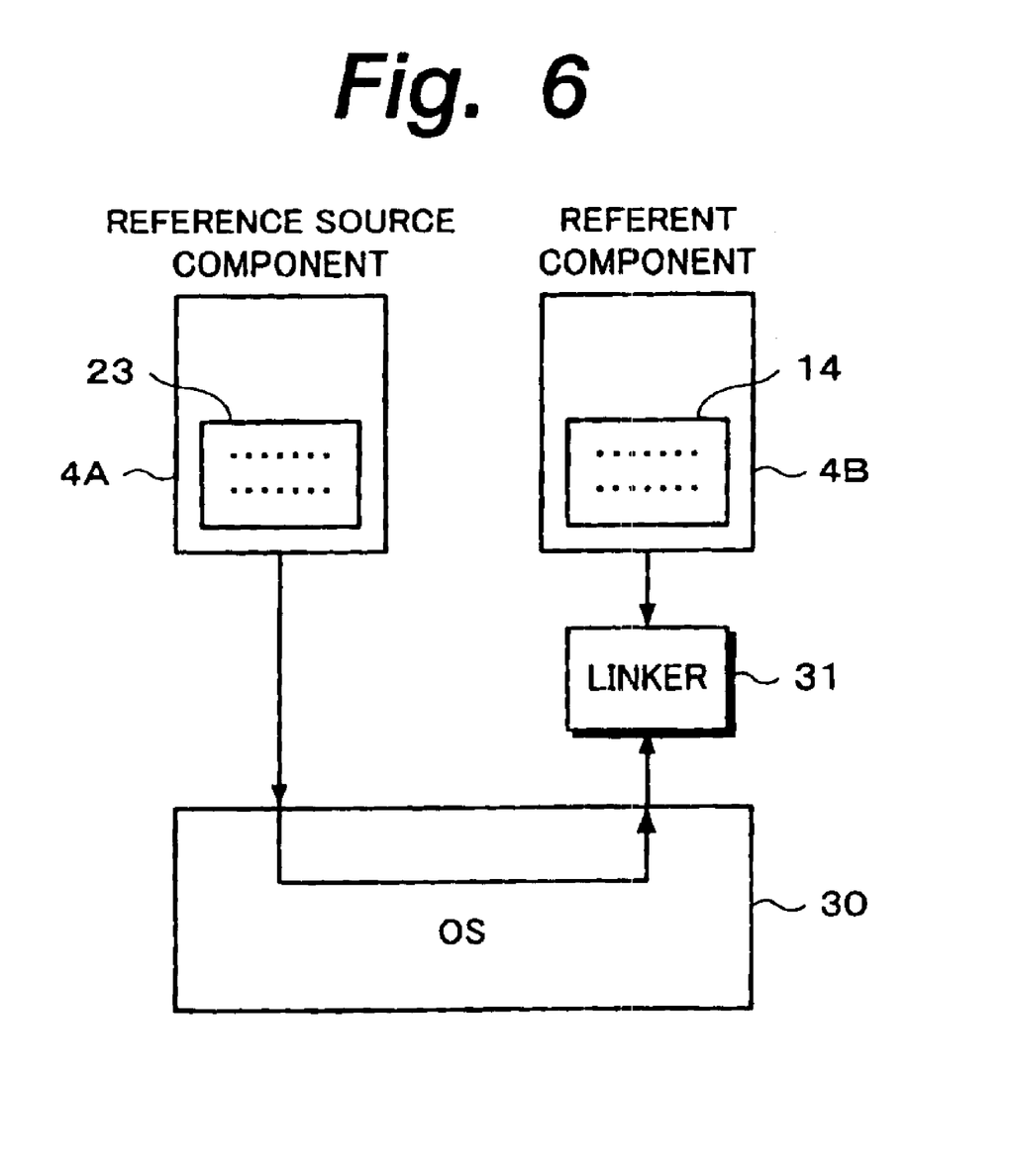
FIG. 6 is a block diagram schematically showing a link mechanism of a component on a target system.

Next, description will be given to a method of linking the component 4A to be the reference source and the component 4B to be the reference which are generated as described above, thereby creating an execution file. FIG. 6 schematically shows a link mechanism for components on the target system 1. It is assumed that a predetermined program is started in the target system 1 and the component 4A is read on the RAM 13. Based on the description of the component 4A, the component 4B is called and is linked to the component 4A. This processing is actually carried out based on the control of the OS 30.

Based on the symbol reference information table 23 of the component 4A, a linkage of the component 4B is requested from the component 4A to an OS 30. The request of the linkage is transferred from the OS 30 to a linker 31. The linker 31 refers to the symbol reference information table 23 of the component to be the reference source and the symbol information table 14 of the component 4B to be the referent based on the request. The linker 31 links the component 4A to be the reference source to the component 4B to be the referent based on the component ID and the symbol ID which are described in the tables 23 and 14.

Figure 7:
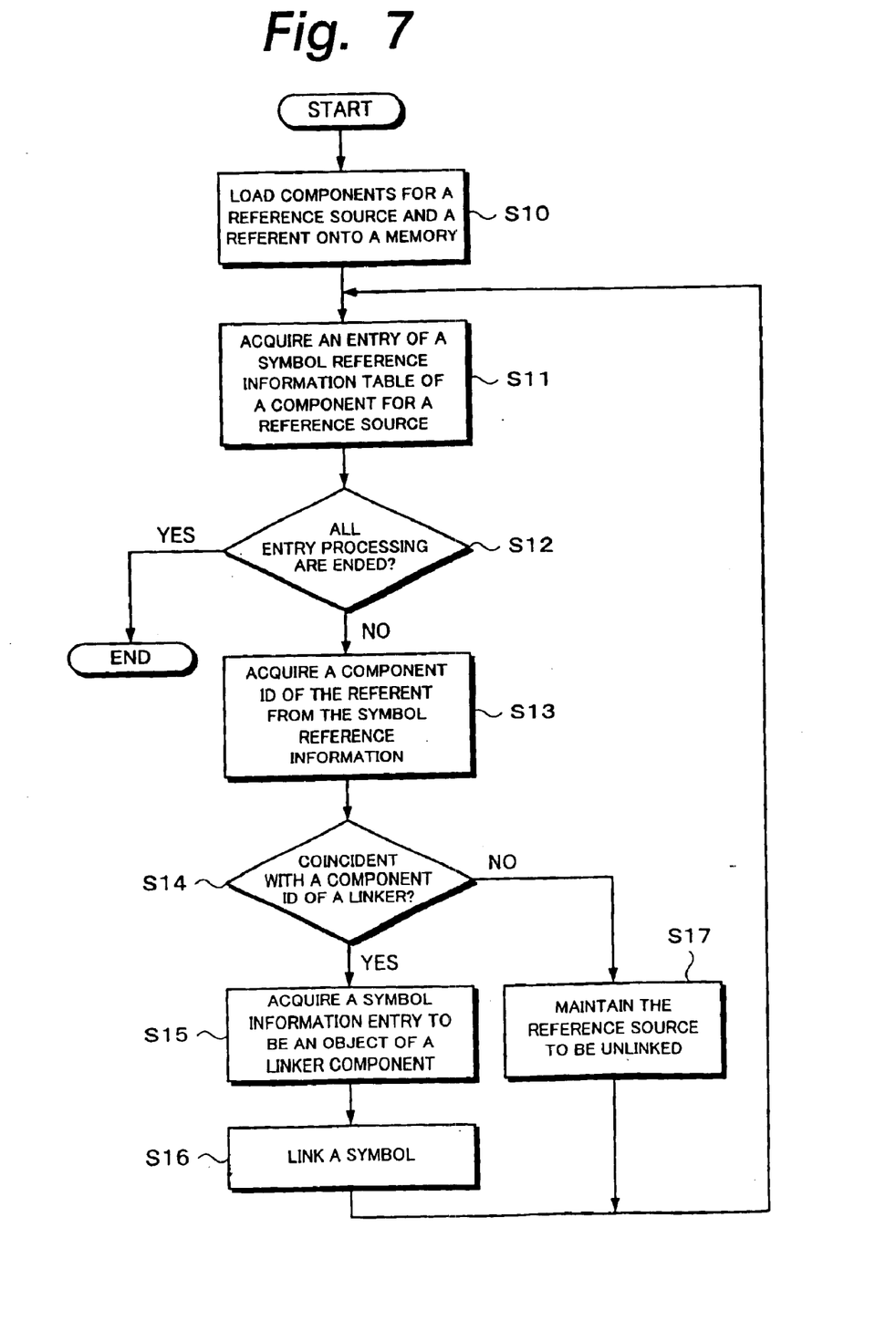
FIG. 7 is a flow chart showing the procedure for linking components in the target system according to an example.

FIG. 7 is a flow chart showing the procedure for linking components in the target system 1 according to an example. The processing of the flow chart is carried out through the link 31 based on the control of the OS 30. At a first step S10, the component 4A to be the reference source and the component 4B to be the referent are read in the RAM 13 and are loaded onto the target system 1. This processing is carried out by retrieving a proper component from a component stored in the secondary storage medium 3 based on the component name and version information of the component 4B to be the referent which are described in the component 4A to be the reference source through a component loader which is not shown, for example.

When the components 4A and 4B to be the reference source and the referent are loaded respectively, a link request for the component 4B to be the reference source is given from the component 4A to be the reference source to the OS 30 and is transferred from the OS 30 to the linker 31 as described above. At a next step S11, one entry is acquired from the symbol reference information table 23 of the component 4A to be the reference source through the linker 31. If it is decided that the processing is ended for all the entries of the symbol reference information table 23 (step S12) and a series of flow charts are ended.

If it is decided that there is an entry which has not been completely processed in the reference source information table 23 at the step S12, the processing proceeds to a step S13. At the step S13, a corresponding entry of the symbol information table 14 of the component 4B to be the referent is retrieved based on the symbol reference information table 23 of the component 4A to be the reference source. As described above, the symbol name in the symbol reference information table 23 of the component 4A to be the reference source is constituted by a combination of the component ID and the symbol ID. Therefore, the component ID of the component 4B to be the referent is acquired based on the description of the symbol reference information table 23.

At a step S14, it is decided whether or not the component ID thus acquired is coincident with the component ID of the component 4B to be the referent which is a linker. If they are not coincident with each other, the processing proceeds to a step S17 where the component 4A to be the reference source is not linked to the component 4B to be the referent. Then, the processing is returned to the step S11 where a next entry of the symbol reference information table 23 is acquired.

On the other hand, if it is decided that the component ID acquired at the step S13 is coincident with the component ID of the component 4B to be the referent at the step S14, the processing proceeds to a next step S15. At the step S15, the symbol information table 14 of the component 4B to be the referent which is the linker is referred and a symbol information entry to be linked is acquired.

More specifically, at the step S15, the symbol ID making a pair with the component ID acquired at the step S13 is obtained based on the symbol reference information table 23. Then, the entry of the symbol information table 14 of the component 4B to be the referent is retrieved based on the symbol ID thus obtained.

At the step S15, a symbol value corresponding to the symbol ID is obtained based on the result of the retrieval of the step S14. Consequently, a reference place described in the symbol reference information table 23 can be referred and the symbols are linked (step S16). A series of processings are carried out for each entry of the symbol reference table 23 of the component A to be the reference source.

The original symbol name used in the object file 11 acting as the origin of the component 4B to be the referent and the original symbol name used in the object file 21 acting as the origin of the component 4A to be the reference source are wholly replaced with the symbol names obtained by a combination of the component ID and the symbol ID during the generation of the components. Therefore, the external symbol reference file 13 of the component to be the referent, the external symbol reference file 13' of the component to be the reference source and the information about the original symbol name which is obtained before the replacement of each symbol name are not required after the generation of the components.

As described above, according to the present invention, the symbol information required on the target system 1 is replaced with the symbol ID for use. The symbol ID can be more shortened as compared with the original symbol name. Consequently, it is possible to reduce the amount of a memory for storing the symbol name on the target system 1 and it is possible to shorten a time required for the processing during the symbol retrieval when the components are linked.

According to the present invention, moreover, the component ID is added to the symbol reference information to be the reference source. Consequently, it is possible to decide from a comparison of the component IDs whether or not the symbol to be the referent of the symbol reference information is present in the component to be the linker during the linkage of the components. Accordingly, it is possible to shorten a time required for a processing of retrieving a symbol.

According to the present invention, furthermore, the symbol names of all the components are treated to be replaced and component identification information (component ID) to which respective symbols belong is added to the symbol IDs. Therefore, also in the case in which the same symbol name is declared in two or more different components, it is possible to treat them to be separate symbols.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A method for creating componentware in which a first componentware and a second componentware, which is adapted to provide reference source for the first componentware, are linked to each other during loading onto a system, comprising the steps of:
    generating the first componentware by replacing a first symbol name, adapted to be referred externally, with a first symbol ID adapted to identify the first symbol name;
    creating first table data indicative of a relationship between the first symbol name and the first symbol ID;
    creating external list data indicative of a relationship between the first symbol name and the first symbol ID;
    generating the second componentware by replacing a second symbol name, adapted to be a reference source for the first componentware, with a second symbol ID, wherein the second symbol ID is adapted to identify the second symbol name as a function of the external list data; and
    creating second table data indicative of a relationship between the second symbol name and the second symbol ID,
    wherein the first componentware and the second componentwares are linked to each other as a function of the first table data and the second table data.

2. The componentware creating method according to claim 1, further comprising the steps of:
    providing a component ID adapted to identify the first componentware; and
    adding the component ID to the first componentware,
    wherein the second componentware refers to the first componentware as a function of the component ID and the symbol ID.

3. The componentware creating method according to claim 1, further comprising the steps of:
    creating a relational list as a function of a relationship between the first symbol name and the first symbol ID; and
    replacing the first symbol name with the first symbol ID as a function of the relational list.

4. The componentware creating method according to claim 3, further comprising the steps of:
    deleting a symbol ID when the corresponding symbol name is deleted; and
    adding a new symbol ID when a corresponding new symbol name is added.

5. A recording medium adapted to record componentware comprising:
    a symbol name data; and
    symbol ID data, adapted to identify corresponding symbol name data,
    wherein the symbol ID data is described as a function of corresponding symbol location and as a function of a component ID adapted to identify at least a portion of the componentware,
    wherein particular symbol name data is replaced by corresponding symbol ID data.

6. The componentware creating method according to claim 1, further comprising the steps of:
    determining a source of components of the componentware; and
    accessing the components from the source.

7. The componentware creating method according to claim 6, wherein the source is a secondary source.

8. The componentware creating method according to claim 1, further comprising the steps of:
    determining a deletion of one or more symbols; and
    deleting one or more symbol IDs that correspond to the one or more deleted symbols.

9. A recording medium adapted to record componentware comprising:
    a symbol reference information table adapted to store reference component data, a component ID, adapted to identify information for corresponding componentware and a symbol ID, adapted to identify information for corresponding componentware; and
    a correspondence data table that determines whether the component ID and the symbol ID correspond to particular reference component data,
    wherein an indication of such correspondence is generated when a correspondence is determined and the symbol ID is unique for the particular reference component data, and
    wherein the componentware is adapted to be linked to external componentware.

* * * * *